(12) United States Patent
Schmengler et al.

(10) Patent No.: US 11,248,405 B2
(45) Date of Patent: Feb. 15, 2022

(54) BRAKE MODULE FOR A DRIVE SYSTEM, DRIVE SYSTEM AND PRODUCTION METHOD FOR A BRAKE MODULE

(71) Applicant: STABILUS GMBH, Koblenz (DE)

(72) Inventors: Marcel Schmengler, Bad Neuenahr (DE); Magnus Hümmerich, Koblenz (DE); Sergei Mazepa, Kaisersesch (DE)

(73) Assignee: STABILUS GMBH, Koblenz (DE)

( * ) Notice: Subject to any disclaimer, the term of this patent is extended or adjusted under 35 U.S.C. 154(b) by 69 days.

(21) Appl. No.: 16/379,072

(22) Filed: Apr. 9, 2019

(65) Prior Publication Data
US 2019/0323277 A1 Oct. 24, 2019

(30) Foreign Application Priority Data

Apr. 20, 2018 (DE) .................. 10 2018 109 569.4

(51) Int. Cl.
*F16D 55/22* (2006.01)
*E05F 5/00* (2017.01)
(Continued)

(52) U.S. Cl.
CPC ............... *E05F 5/00* (2013.01); *F16D 55/22* (2013.01); *F16D 59/00* (2013.01);
(Continued)

(58) Field of Classification Search
CPC .......... E05Y 2201/21; E05Y 2900/132; E05Y 2201/26; E05Y 2201/256; F16F 7/02;
(Continued)

(56) References Cited

U.S. PATENT DOCUMENTS 1,979,644 A * 11/1934 Saito .................. B61H 13/02
188/33
3,028,619 A * 4/1962 Schlage ................ E05F 3/221
16/49
(Continued)

FOREIGN PATENT DOCUMENTS

CN 695576 A5 * 6/2006
DE 102011056307 A1 * 6/2013 ............... C23C 4/02
(Continued)

OTHER PUBLICATIONS

English translation of JP 2002020839A (Year: 2002).*

*Primary Examiner* — Robert A. Siconolfi
*Assistant Examiner* — Mahbubur Rashid
(74) *Attorney, Agent, or Firm* — Schmeiser, Olsen & Watts, LLP

(57) ABSTRACT

A brake module for a drive system, in particular for doors, including at least one thrust washer and at least one brake disc, wherein the at least one thrust washer and the at least one brake disc each have at least one friction surface rubbing against each other during braking operation is provided. The embodiments also relate to a drive system, in particular for doors, including such a brake module. The embodiments further relate to a production method for a brake module of the abovementioned type. Known brake modules have a high variation in the braking force on the one hand in the course of their service life and on the other hand as a function of the temperature.

10 Claims, 7 Drawing Sheets

(51) Int. Cl.
*F16D 59/00* (2006.01)
*F16D 65/00* (2006.01)
*F16D 65/12* (2006.01)
*F16D 69/02* (2006.01)
*F16D 69/04* (2006.01)
*F16D 65/092* (2006.01)
*F16D 65/18* (2006.01)
*F16D 65/02* (2006.01)
*F16D 121/14* (2012.01)

(52) U.S. Cl.
CPC ....... *F16D 65/0081* (2013.01); *F16D 65/123* (2013.01); *F16D 65/125* (2013.01); *F16D 65/128* (2013.01); *F16D 69/02* (2013.01); *F16D 69/0408* (2013.01); *E05Y 2201/21* (2013.01); *E05Y 2201/26* (2013.01); *E05Y 2900/531* (2013.01); *F16D 65/092* (2013.01); *F16D 65/186* (2013.01); *F16D 2065/132* (2013.01); *F16D 2065/1328* (2013.01); *F16D 2065/1356* (2013.01); *F16D 2065/1388* (2013.01); *F16D 2069/0466* (2013.01); *F16D 2121/14* (2013.01); *F16D 2200/006* (2013.01); *F16D 2200/0021* (2013.01); *F16D 2200/0034* (2013.01); *F16D 2200/0052* (2013.01); *F16D 2200/0078* (2013.01); *F16D 2250/0038* (2013.01); *F16D 2250/0046* (2013.01); *F16D 2250/0069* (2013.01)

(58) Field of Classification Search
CPC ...... F16F 15/1292; F16F 2222/04; F16F 7/08; E05F 3/14; E05F 5/00; E05F 5/10; F16D 2065/024; F16D 63/00; F16D 2055/0058; F16D 2069/004; F16D 65/097; F16D 65/84; F16D 67/02
See application file for complete search history.

(56) References Cited

U.S. PATENT DOCUMENTS

| | | | | |
|---|---|---|---|---|
| 3,275,109 A | * | 9/1966 | Ganley | F16D 67/02 192/223 |
| 3,306,741 A | * | 2/1967 | Lallemant | C22C 29/062 419/14 |
| 3,815,635 A | * | 6/1974 | Jansen | F16B 31/04 137/833 |
| 4,279,330 A | * | 7/1981 | Pottorff | F16D 55/40 188/170 |
| 4,498,560 A | * | 2/1985 | Purdy | B60T 1/065 188/1.11 R |
| 5,046,590 A | * | 9/1991 | Trema | B60T 1/065 188/106 P |
| 5,146,808 A | * | 9/1992 | Hoshino | F16M 13/027 16/235 |
| 5,685,398 A | * | 11/1997 | Marshall | F16D 55/28 164/108 |
| 6,170,616 B1 | * | 1/2001 | White | F16D 13/52 188/170 |
| 6,684,455 B1 | * | 2/2004 | Mertin | E05D 11/087 16/328 |
| 6,948,217 B2 | * | 9/2005 | Higano | G06F 1/1616 16/303 |
| 7,043,798 B2 | * | 5/2006 | Huang | G06F 1/1616 16/303 |
| 7,171,726 B2 | * | 2/2007 | Kleissen | B60R 1/074 16/235 |
| 8,827,050 B2 | * | 9/2014 | Iraschko | E05D 11/087 16/340 |
| 9,429,227 B2 | * | 8/2016 | Noerenberg | B60K 17/046 |
| 2002/0034349 A1 | * | 3/2002 | Thompson | F16C 9/02 384/420 |
| 2004/0187260 A1 | * | 9/2004 | Bruckner | E05D 11/1085 16/334 |
| 2006/0144664 A1 | * | 7/2006 | Antchak | B60K 17/046 |
| 2011/0266110 A1 | * | 11/2011 | Arnold | G06F 1/1616 16/303 |
| 2013/0140776 A1 | * | 6/2013 | Kennedy | C23C 28/00 277/442 |
| 2013/0169087 A1 | | 7/2013 | Kummer | |
| 2013/0248305 A1 | * | 9/2013 | Choi | B60R 1/074 16/235 |
| 2014/0090204 A1 | * | 4/2014 | Sarnowski | E05D 11/087 16/340 |
| 2014/0291104 A1 | * | 10/2014 | Boyes | F16D 27/105 192/75 |
| 2015/0233467 A1 | * | 8/2015 | Noerenberg | B60K 17/046 192/221.1 |
| 2018/0313123 A1 | * | 11/2018 | Kenyon | E05D 3/02 |

FOREIGN PATENT DOCUMENTS

| | | |
|---|---|---|
| EP | 1640633 A1 | 3/2006 |
| EP | 1664470 A1 | 6/2006 |
| EP | 1930619 A2 | 6/2008 |
| JP | 2002020839 A * | 1/2002 |
| JP | 2008121836 A * | 5/2008 |

\* cited by examiner

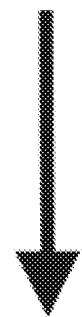

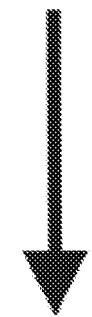

BRAKE MODULE FOR A DRIVE SYSTEM, DRIVE SYSTEM AND PRODUCTION METHOD FOR A BRAKE MODULE

CROSS-REFERENCE TO RELATED APPLICATIONS

This application claims priority to DE 10 2018 109 569.4, having a filing date of Apr. 20, 2018, the entire contents of which are hereby incorporated by reference.

FIELD OF TECHNOLOGY

The following relates to a brake module for a drive system, in particular for doors, comprising at least one thrust washer and at least one brake disc, wherein the at least one thrust washer and the at least one brake disc each have at least one friction surface rubbing against each other during braking operation. The following also relates to a drive system, in particular for doors, comprising such a brake module. The following further relates to a production method for a brake module of the type mentioned above.

BACKGROUND

A drive system for adjustment devices in motor vehicles is known from EP 1 664 470 B1. The drive system comprises a housing in which a drive element of the adjustment device, a disc motor having an armature disc and a planetary gear are arranged. The planetary gear has a housing-fixed ring gear having internal teeth, an output ring gear connected to the drive element of the adjustment device having internal teeth and a radially flexible ring, the outer teeth of which partially mesh with the internal teeth of the housing-fixed ring gear and the output ring gear and rolls its inner shell surface on rollers. The output ring gear is connectable to a wrap spring brake, whereby the self-locking of the drive system increases and, for example, in a window lifter prevents an unauthorized access to the vehicle interior from being created by pressing down the window pane.

US 2013/0169087 A1 discloses a drive system for setting in motion a movable panel of a vehicle. The drive system in one embodiment comprises a mechanical brake module having a tubular brake shaft and a coil spring arranged coaxially therein.

In the known art, such drive systems are used in particular for the electromechanical opening and closing of doors, such as vehicle doors. On the one hand, the drive system can assist with the manual opening, keeping open and closing of the door and/or open and close the door independently. The power of an electric motor is transmitted to the door, for example, in a linear drive via a threaded spindle.

The brake module has several functions in this case. First, it enables, for example, maintaining a fairly heavy tailgate of a vehicle in an (arbitrary) angular position and, on the other hand, a more even movement of the drive system. Furthermore, damage, for example to a tailgate can be avoided when closing due to excessive acceleration forces (in particular by a manual force of the user and a weight of the tailgate) through the opposite braking force or the resulting torque.

The amount of braking force can be defined in particular by the choice of material and/or number of friction partners, the geometry of which, and, if appropriate, via the choice of the spring force of a spring which presses the thrust washer(s) against a brake disc.

Usually, the brake disc and the thrust washer(s) rotate relative to each other in braking operation. Common materials for the friction partners are sintered steel for the brake disc and nitrided chrome steel for the thrust washer.

In generic brake modules, the problem is that the braking force is not constant over the service life of the brake modules and is additionally temperature-dependent.

SUMMARY

An aspect relates to a cost-effective brake module for a drive system and an easily implementable production method therefor, which provides a predictable braking force for the drive system and increases a service life of the drive system.

A brake module according to embodiments of the invention for a drive system, in particular for doors, comprises at least one thrust washer and at least one brake disc, wherein the at least one thrust washer and the at least one brake disc each have at least one friction surface rubbing against each other during braking operation.

In the context of embodiments of the invention, the term "door" is understood to mean a component for at least partially closing an opening of a building, a device or a vehicle. In particular, the "door" can be a vehicle door, for example, an access door for passengers of the vehicle, a motor hood, a trunk lid, a cargo-space door or a tailgate. Within the context of embodiments of the invention, a "vehicle" can be, for example, a land vehicle, a watercraft or an aircraft, in particular an automobile. The brake module according to embodiments of the invention is particularly suitable for a drive module for vehicle doors, because there, for example, a constant and predictable braking force is particularly important for reasons of operational reliability. In addition, drive systems for vehicle doors are often installed in such a way, that they are difficult to replace so that a long service life is particularly important.

At least one of the friction surfaces can be formed from a friction layer to protect the brake disc and/or thrust washer against wear, wherein at least the friction layer can comprise fibers and/or carbon. This makes it possible to achieve a more constant braking force over the service life of the brake module, a lower temperature dependence of the braking force and a longer service life of the brake module. Therefore, the braking force can also be better adapted to the particular application and a significantly lower tolerance compensation is necessary. In the case of use for a tailgate of a vehicle, this enables, for example, a lower braking force for medium temperatures of the braking system (about 20° C.) and thus an easier operation from any starting position in any other end position of the door, that is, in particular an opening or a closing, of the tailgate. The end position can be any intermediate position between a maximum open position and a closed position. At the same time, the functionality is not restricted at higher temperatures or at the beginning of the use of the drive system. In particular, the drive system becomes more reliable and, at the same time, smoother over the service life and over variable operating parameters (such as the temperature of the brake module) because a safety tolerance between a minimum braking force to be able to hold the door in any intermediate position and a manual force for positional change can be made smaller.

The more constant and better predictable braking force compared to a sintered brake disc can be explained in part by the more uniform surface of a brake disc according to embodiments of the invention. At the beginning, sintered brake discs have rounded edge regions through the sintering process and thus a reduced effective friction surface. A brake disc having a friction layer according to embodiments of the invention for protection of the brake disc from wear, however, has a flatter friction surface from the outset and the effective friction surface does not alter in the course of operation of the brake module.

Further embodiments are described by way of example with reference to friction layers which form friction surfaces of the brake disc. In the context of embodiments of the invention, these embodiments can be additionally or alternatively also transferred to friction layers which form friction surfaces of the thrust washer.

At least one, in particular each, friction surface of the brake disc is formed by a respective friction layer according to embodiments of the invention. As a result, the aforementioned effects of the friction layers occur particularly significantly.

The entire brake disc or only one part, such as one or more layers of the brake disc, can be formed by the friction layer. A friction layer of the brake disc can thus form, for example, one or more surface layers (for example, friction layers) of the brake disc or form the entire brake disc.

The friction layer can comprise carbon fibers, a carbon fiber mesh. Carbon fibers, in particular in a carbon fiber mesh, can withstand very high mechanical loads at low weight, in particular when a high number of fibers is combined to form a filament yarn. As a result, a high reliability of the brake module is achieved with low weight.

The friction layer can comprise a fiber-reinforced, glass fiber-reinforced and/or carbon fiber-reinforced, plastic. The superior mechanical properties of the fibers can be advantageously combined with the simple processing of a plastic in the form of a fiber-reinforced plastic, which results in a reliable, lightweight and inexpensive to produce brake module.

The friction layer can comprise a metal-containing and/or hydrogen-containing, amorphous carbon layer. Amorphous carbon layers are characterized by high wear resistance. A composite of an a-C:H matrix and metal carbides is formed by doping hydrogen-containing amorphous carbon layers (a-C:H) with metals. Layers of this material have high wear resistance, low coefficients of friction and better adhesion of the layers. The material properties can be strongly influenced by changing the metal content and thus adapted to the requirements of the drive system.

The brake module can comprise a spring, which presses the brake disc against the at least one thrust washer by a spring force. The spring is a zigzag spring, whereby a uniform spring force is achieved, and the brake module is stabilized. The spring can be arranged on a side of a thrust washer opposite the brake disc and press the thrust washer against the brake disc.

The brake module can respectively comprise a thrust washer on two opposite sides of the brake disc, wherein the brake disc respectively comprises a friction surface (respectively having a friction layer according to embodiments of the invention) facing each of the thrust washers. A longer service life and higher braking force can be achieved by using two thrust washers on both sides of the brake disc without significantly increasing the dimensions of the brake module.

The brake disc can comprise a carrier, for simultaneous reasons of weight, costs and stability, in particular made of plastic, and at least one friction layer connected to the carrier, and two friction layers connected to the carrier on opposite sides of the carrier. In this embodiment, the brake disc comprises a plurality of layers, whereby better overall properties of the brake disc can be achieved. For example, the carrier can be less elastic or more elastic than a brake disc completely consisting of a friction layer (as required by the application specifications and the drive system in which the brake disc is used). In addition, the thermal expansion behavior of the brake disc when using two or more different materials can better be adapted to the thermal expansion behavior of the thrust washer(s) and thus reduce the temperature dependence of the braking momentum. Furthermore, the carrier can be made of a cost-effective material, such as a plastic, whereby the total cost of the brake disc can be reduced.

At least one friction layer can be fastened firmly bonded to the carrier, by means of a partially elastic adhesive. A material-bond connection, for example, by an adhesive or by coating the carrier with an amorphous carbon layer, ensures a particularly long-term stable and reliable connection of the friction layer to the carrier. The partially elastic adhesive, for example, can compensate for different thermal expansion coefficients of the friction layer(s) and the carrier. Furthermore, the partially elastic adhesive enables improved vibration damping.

At least one thrust washer can consist of steel, in particular of, non-nitrided chromium-5 steel. Although it has been found that a thrust washer made of non-nitrided chromium-5 steel has a shorter service life than a thrust washer made of nitrided chromium-5 steel, the development of vibration and noise from friction is significantly reduced with a brake disc made of fiber-reinforced plastic with respect to nitrided chromium-5 steel. Such a brake module according to embodiments of the invention having thrust washer(s) made of non-nitrided chromium-5-steel nonetheless has a service life comparable or even longer than a brake module of the known art.

The brake disc can be annular and in particular have a central aperture, wherein the central aperture is approximately circular, in particular having at least two tooth sections separated from each other by a number of, for example one, two, three, four, five, six or seven, clearances; wherein the tooth sections comprise radially inwardly projecting teeth. Such a configuration allows a more flexible connection of the brake disc, for example, to a drive shaft, in particular a threaded spindle, of the drive system. A tilting of the brake disc and the spindle nut is thus unlikely. Thus, it is also easier to install the brake module late in a production process of a drive system and to avoid vibration damage during assembly or to remove it if the brake module is defective. An approximately circular cross-section of the central aperture can mean, for example, that the cross-section is circular except for the radially inwardly projecting tooth sections. The clearances are advantageously distributed evenly around the central aperture in the circumferential direction of the brake disc, that is, at a constant angular distance from each other, to ensure uniform loading of the brake disc and thus a long service life of the same.

The brake disc and/or the thrust washer can have a number of depressions in a friction surface for receiving a lubricant. The depressions can serve as a reservoir for a lubricant adapted to the friction partners, that is, for example, to chromium-5 steel and a carbon-containing friction layer, and thus increase the service life of the brake module without that large amounts of the lubricant are required.

The brake module can comprise a housing in which the brake disc and the at least one thrust washer are guided, coaxially about a central axis, in particular the longitudinal axis of a drive shaft, in particular a threaded spindle, of the drive system, wherein the brake module comprises a cover plate which, by a latching connection, is connected to the housing such that the brake disc and the at least one thrust washer are held in the housing. The cover plate may, for example, have latching recesses, in which latching hooks of the housing can engage. Advantageously, the latching connection can be designed so that the cover plate can not be separated from the housing without destruction. As a result, components arranged in the housing are protected against manipulation.

The structure of the brake module along the longitudinal axis is as follows: spring, thrust washer, brake disc, thrust washer, cover plate. These components are all at least partially surrounded by the housing. This makes it easy to assemble the brake module in the drive system without the risk of losing part of the brake module.

The housing can comprise a number of, for example one, two, three, four, five, six or seven, housing slots, the slot longitudinal axis of which is advantageously aligned parallel to the longitudinal axis of the drive shaft. Furthermore, at least one thrust washer can have thrust washer projections radially outward from the longitudinal axis, which projections are shaped complementary to the housing slots, so that the housing slots and the thrust washer projections cooperate in a form-fitting manner against a rotation of the thrust washer about the longitudinal axis relative to the housing. This prevents the thrust washer from rotating with the brake disc during a braking operation, which could reduce or even eliminate the braking effect. By aligning the slot longitudinal axis parallel to the longitudinal axis of the drive shaft, the thrust washer can be easily inserted along the longitudinal axis in the housing during assembly of the brake module. Advantageously, the housing slots are evenly distributed in the circumferential direction of the housing about the longitudinal axis, that is, at constant angular distance from each other. As a result, the housing is evenly loaded, which increases its service life.

The aspect according to embodiments of the invention is also achieved by a drive system, in particular for a door, comprising a brake module according to one of the preceding embodiments.

The aspect according to embodiments of the invention is also achieved by a production method for a brake module, in particular according to embodiments of the invention, comprising at least one thrust washer and at least one brake disc, wherein the at least one thrust washer and the at least one brake disc each have at least one friction surface which rub against each other in braking operation, wherein the method comprises the following steps:
a. providing a, in particular disc-shaped, carrier,
b. coating the carrier on at least one side with a friction layer comprising fibers and/or carbon in order to form the brake disc or the thrust washer.

The material of at least one friction layer of the brake disc and/or the thrust washer thus comprises fibers or carbon, which can achieve a temporally constant braking force, a lower temperature dependence of the braking force and a longer life of the brake module. As a result, the braking force can also be better adapted to the particular application and a significantly lower tolerance compensation is necessary. The carrier can be, for example, more elastic or less elastic than a brake disc and/or thrust washer consisting entirely of the friction layer. In addition, the thermal expansion behavior of the brake disc when using several, in particular two, different materials can be better matched to the thermal expansion behavior of the thrust washer(s) and thus reduce the temperature dependence of the braking force. Furthermore, the carrier can consist of a low-cost plastic, which can reduce the total cost of the brake disc and/or thrust washer.

The carrier is coated on two opposite sides with a friction layer in order to form the brake disc.

The step of coating the carrier can comprise applying a partially elastic adhesive layer to at least one side of the carrier, after which the friction layer is applied to the adhesive layer. The adhesive layer can, for example, compensate for different coefficients of thermal expansion coefficients of the friction layer(s) and of the carrier. Furthermore, the adhesive layer enables improved vibration damping.

The adhesive can be cured isobarically and variothermically. As a result, a permanent connection between the carrier and the friction layer is achieved.

The production method can also comprise the following steps:
a. providing at least one, disc-shaped, thrust washer blank, which consists of steel, in particular of, non-nitrided, chromium-5 steel, and
b. polishing the thrust washer blank, by ball polishing, in order to form the thrust washer.

It has been found that a particularly uniform friction surface which has less directional artifacts can be achieved by polishing and in particular ball polishing. This also reduces the effect in which the thrust washer flattens during brake operation and the braking force initially varies greatly, for example, in the first few hundred braking cycles. Furthermore, a uniform friction surface leads to less vibration in a braking operation and thus to low noise development.

The at least one thrust washer blank can be deburred, in particular in addition to the polishing, for example, before the polishing. This makes it possible to achieve an even more uniform friction surface of the thrust washer.

Further advantages and features of embodiments of the present invention are explained with reference to the following description and appended drawings in which exemplary brake modules and production methods are shown. Components of the devices, which in the figures are at least basically identical with respect to their function, can in this case be denoted by the same reference characters, wherein these components do not have to be numbered and explained in all figures.

BRIEF DESCRIPTION

Some of the embodiments will be described in detail, with reference to the following figures, wherein like designations denote like members, wherein.

DETAILED DESCRIPTION

Figure 1:
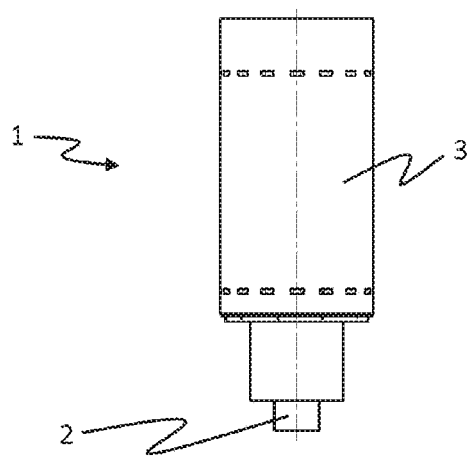
FIG. 1 shows a brake module according to embodiments of the invention in an external view.

FIG. 1 shows a brake module 1 according to embodiments of the invention in an external view. The brake module 1 is here connected to a spindle 2 of a drive system. The brake module 1 comprises a cylindrical outer housing 3.

Figure 2:
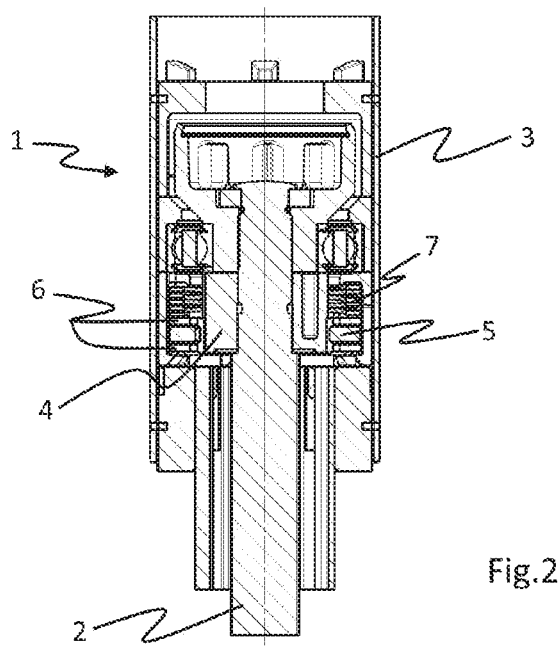
FIG. 2 shows the brake module of FIG. 1 in sectional view.

FIG. 2 shows the brake module 1 of FIG. 1 in a sectional view. The drive system comprises a spindle nut 4 connected to the spindle 2. The spindle nut 4 engages in braking operation in a brake disc 5 of the brake module 1 arranged radially to the longitudinal axis of the spindle outside the spindle nut 4. The brake disc 5 comprises at least two friction surfaces which rub against adjacent friction surfaces of two thrust washers 6 during braking operation as a result of relative rotation of the brake disc 5 about the longitudinal axis relative to the thrust washers 6. As a result, a braking momentum is exerted on the spindle 2 of the drive system. A spring 7 exerts a spring force on one of the thrust washers 6 along the longitudinal axis, whereby the brake disc 5 and the thrust washers 6 are pressed against each other to keep them in frictional contact. The strength of the spring force is a parameter via which the size of the braking force can be set. In this embodiment, the spring 7 is a zigzag spring.

Figure 3:
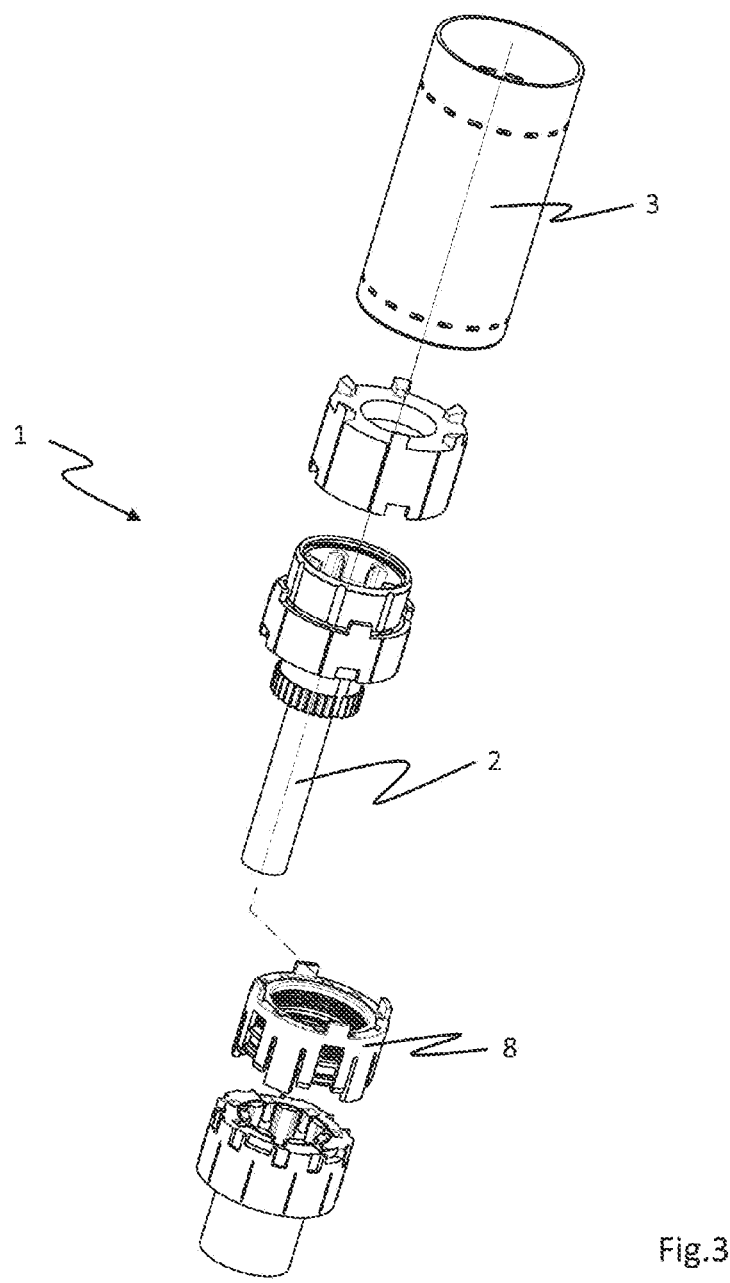
FIG. 3 shows the brake module of FIGS. 1 and 2 in an exploded view.

FIG. 3 shows the brake module 1 of FIGS. 1 and 2 in an exploded view. The brake disc 5, the thrust washers 6 and the spring 7 are all arranged in a housing 8, the structure of which is explained in the following.

Figure 4:
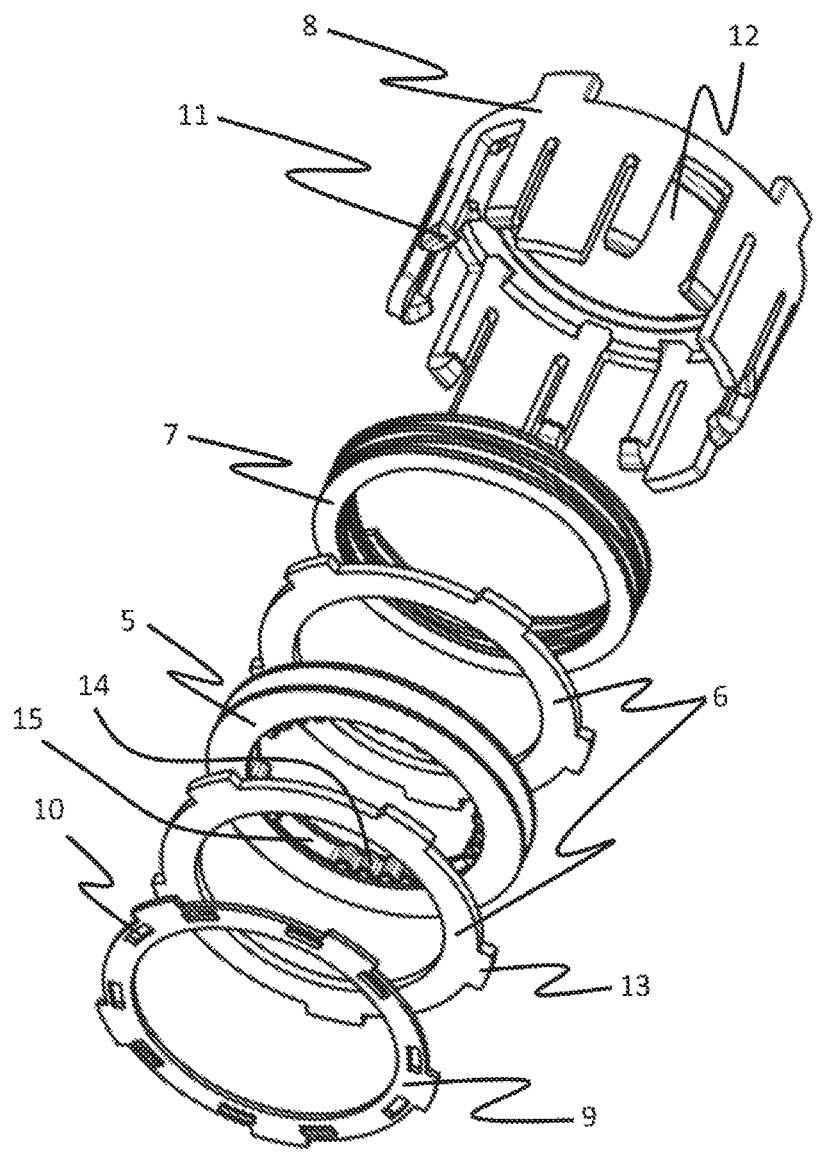
FIG. 4 shows a part of the brake module of FIGS. 1, 2 and 3 in a further exploded view.

FIG. 4 shows a part of the brake module 1 of FIGS. 1, 2 and 3 in a further exploded view. The brake module 1 comprises a cover plate 9 in addition to the housing 8. In the housing 8, the brake disc 5, the two thrust washers 6 and the spring 7 are guided coaxially about the longitudinal axis of the spindle (not shown here). The housing 8 is connected to the cover plate 9 by a latching connection, whereby the brake disc 5, the two thrust washers 6 and the spring 7 are held in the housing 8. The cover plate 9 has latching recesses 10, in which latching hooks 11 of the housing 8 can engage. The structure of the brake module along the longitudinal axis is thus: spring 7, thrust washer 6, brake disc 5, thrust washer 6, cover plate 9. These components are all at least partially surrounded by the housing 8 in the assembled state. This makes it easy to assemble the brake module 1 in the drive system without the risk of losing part of the brake module 1.

The housing 8 further comprises a number of, for example, five, housing slots 12 uniformly distributed around the longitudinal axis of the spindle 2 in the circumferential direction of the housing with a slot longitudinal axis parallel to the longitudinal axis. Thrust washer projections 13 of the thrust washers 6 engage radially from the longitudinal axis outward in the housing slots 12. As a result, a relative rotation of the housing 8 and the thrust washers 6 against each other around the longitudinal axis is prevented when the brake disc 5 rotates with the spindle 2 and rubs against the thrust washers 6 during braking operation.

The brake disc 5 is annular and has a central aperture. The central aperture has an approximately circular cross-section having at least two, for example four, tooth sections 14 uniformly distributed in the circumferential direction of the brake disc 5 about the longitudinal axis, which sections are separated from each other by a recess 15. This is explained in more detail with reference to the following FIG. 5.

Figure 5:
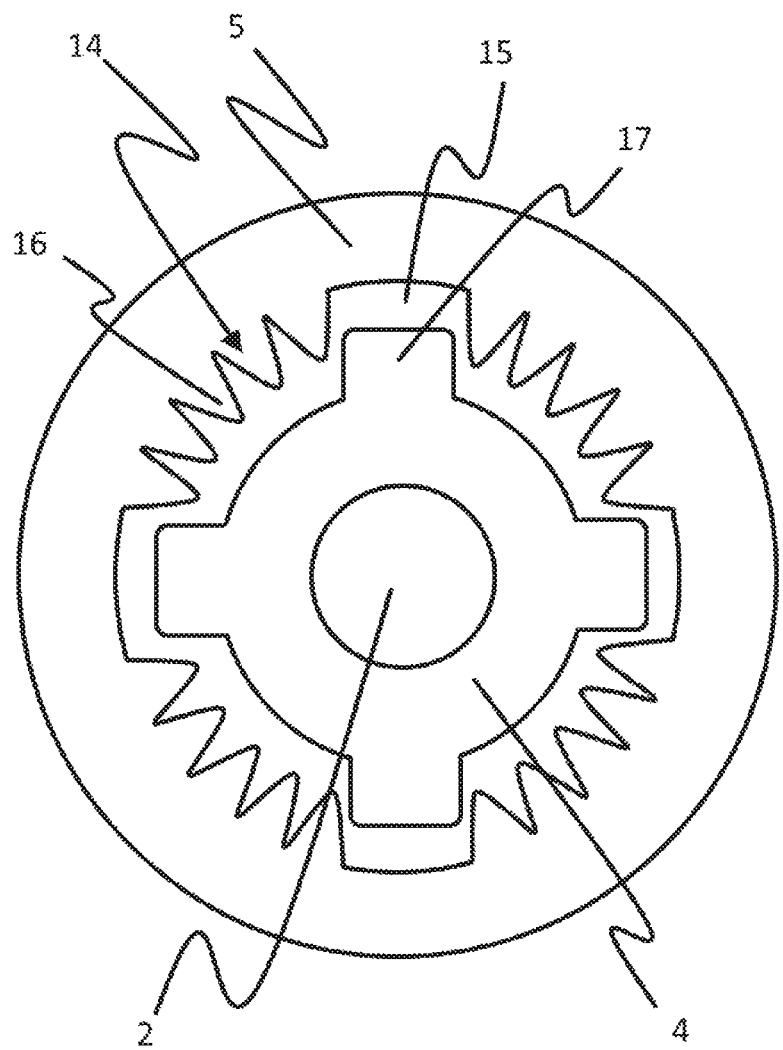
FIG. 5 shows a brake disc according to embodiments of the invention and a spindle nut.

FIG. 5 shows a brake disc 5 according to embodiments of the invention and a spindle nut 4 in top view. The tooth sections 14 comprise teeth 16 projecting radially inwardly. Such a configuration enables a flexible connection of the brake disc 5 to the spindle nut 4 of the drive system. The spindle nut 4 comprises spindle nut wings 17, which engage in the clearances 15, and the torque is transmitted between the spindle nut 4 and the brake disc 5 via the contact between the spindle nut wings 17 and the teeth 16. A tilting of the brake disc 5 and the spindle nut 4 thereby becomes unlikely as in a form-fitting connection. This makes it easier to install the brake module 1 late in the production process of a drive system, to avoid vibration damage by a later assembly time and to replace the brake module 1 when the brake module 1 is defective because the brake module 1 can be placed on the spindle nut 2 more easily.

Figure 6:
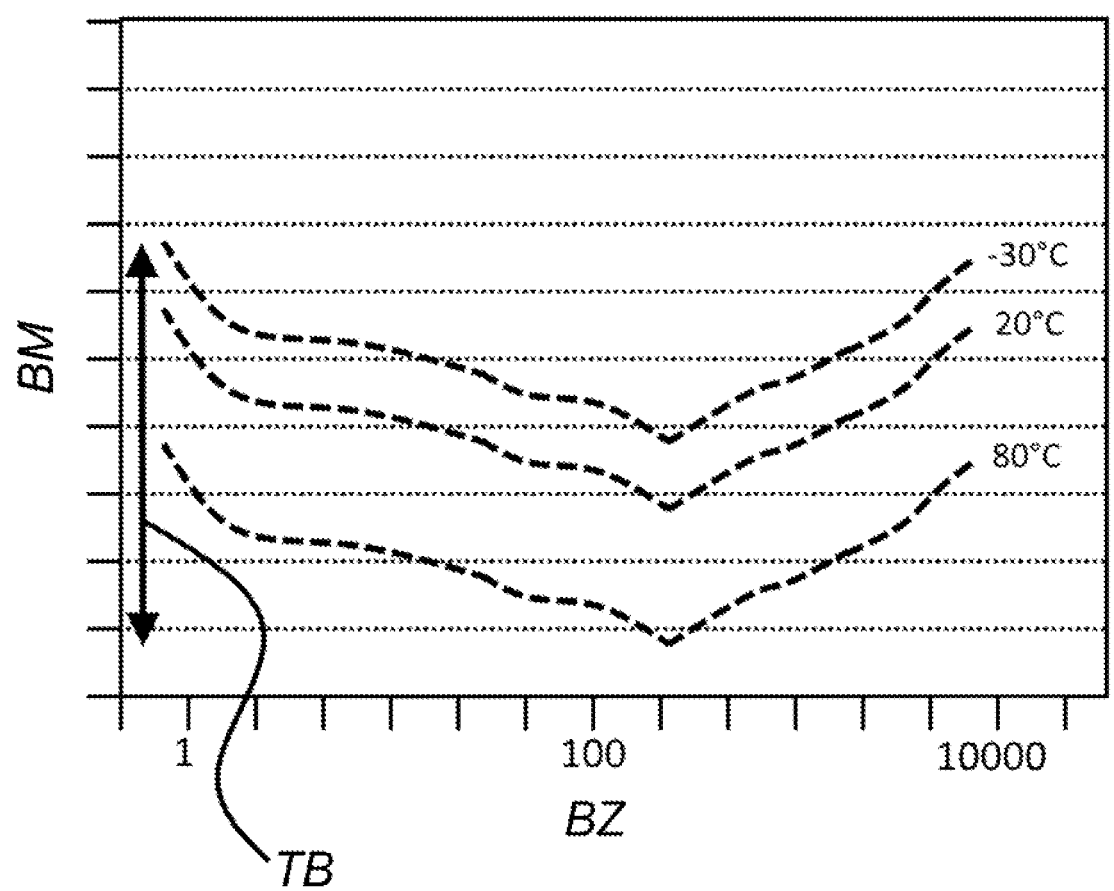
FIG. 6 shows a qualitative illustration of the dependency of the braking momentum of a brake module of the known art as a function of the number of braking cycles and the temperature.

FIG. 6 shows a qualitative representation of the braking momentum BM of a brake module of the known art as a function of the number of braking cycles BZ and the temperature. The braking cycles are represented logarithmically, and the development of the braking force is plotted for three temperatures which cover all relevant operating temperatures. Such a brake module uses, for example, thrust washers made of nitrided chromium jet and a brake disc made of sintered steel. As can be seen in the first few hundred braking cycles, the braking force of the brake module decreases, and then gradually increase again. Furthermore, it can be seen that the braking force varies greatly with the temperature, which is illustrated by the double arrow indicating the tolerance range TB of the brake system.

Figure 7:
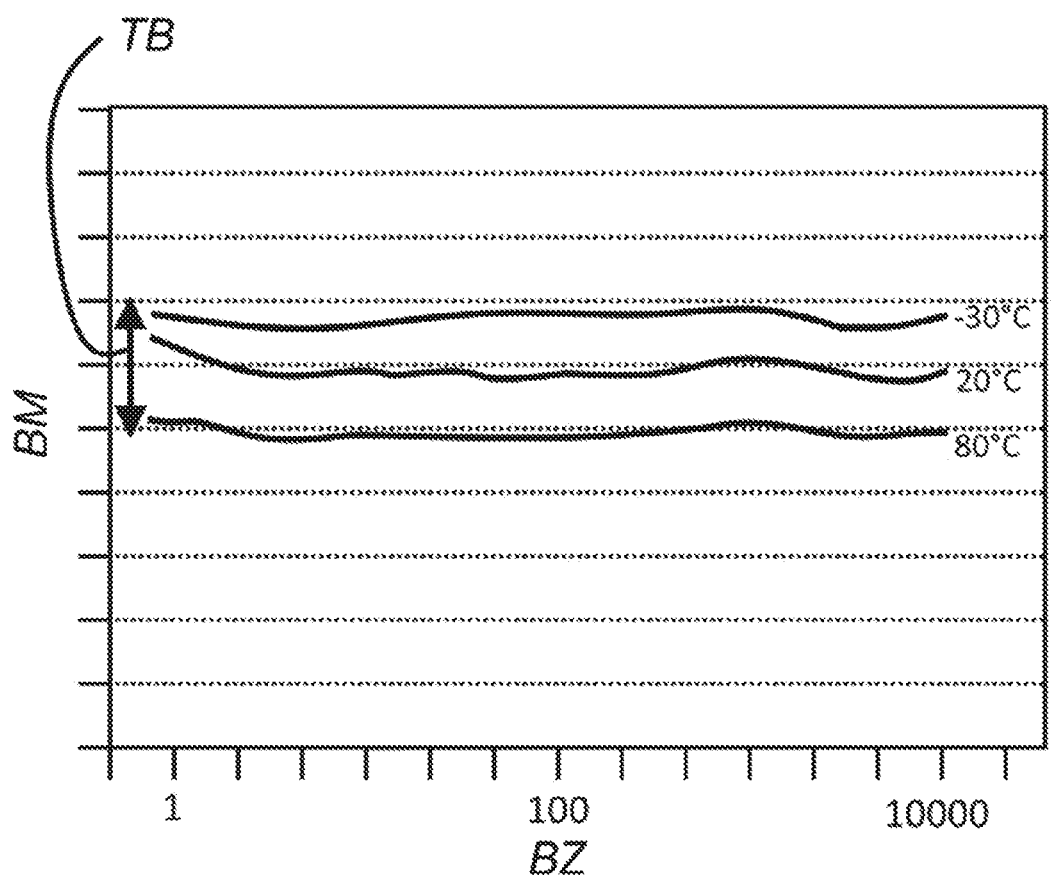
FIG. 7 shows a qualitative illustration of the dependency of the braking momentum of a brake module according to embodiments of the invention as a function of the number of braking cycles and the temperature.

FIG. 7 shows a qualitative representation of the braking momentum BM of a brake module 1 according to embodiments of the invention as a function of the number of braking cycles BZ and the temperature. The braking cycles are again represented logarithmically, and the development of the braking force is plotted for three temperatures which cover all relevant operating temperatures. As can be seen, the braking force varies only slightly as a function of the elapsed braking cycles. Furthermore, it can be seen that the braking force varies less with the temperature, which is illustrated by the double arrow indicating the tolerance range TB of the brake system. Thus, the braking force can be defined much better and does not have to be selected as in the known art so that it is significantly too large for a large part of the service life and the temperature range. As a result, the wear of the brake disc and the thrust washers is reduced on average, which explains in part the increased service life of the brake system. A drive system having such a brake module is also more comfortable to handle and more energy efficient and durable due to the lower braking force in most operating situations.

Figure 8A:
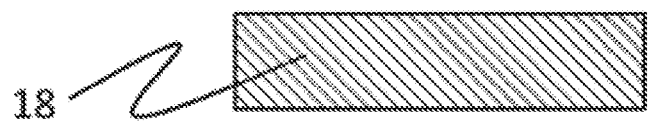
FIG. 8A shows a schematic flow diagram of providing a carrier in a production method according to embodiments of the invention.
Figure 8B:
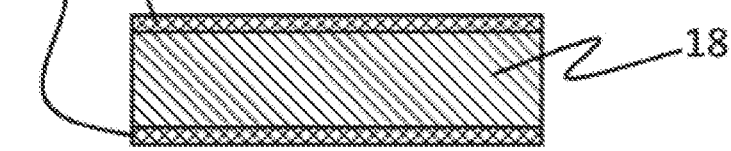
FIG. 8B shows coating the carrier on two sides with an adhesive layer.
Figure 8C:
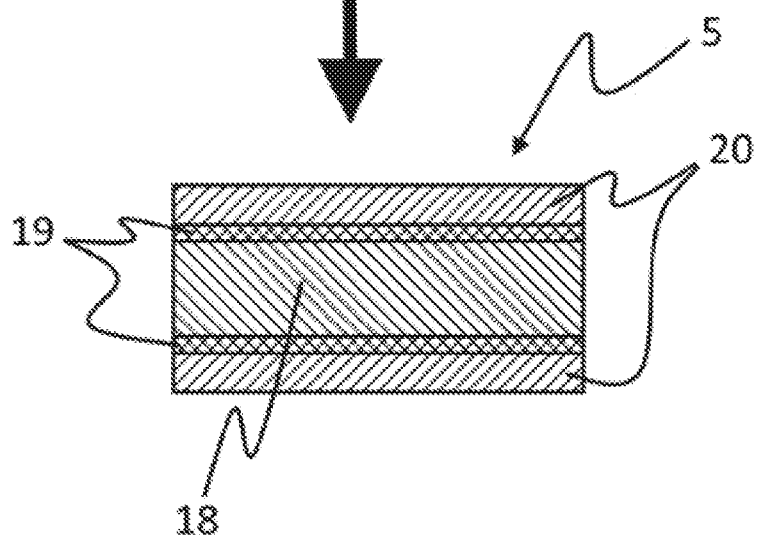
FIG. 8C shows coating with a friction layer comprising fibers and/or carbon in order to form the brake disc.

FIG. 8 shows a schematic flow diagram of a production method according to embodiments of the invention. The production method according to embodiments of the invention here comprises the following steps:

FIG. 8A providing a, for example disc-shaped, carrier 18, for example made of plastic, optional: FIG. 8B coating the carrier 18 on at least one side (here on two sides) with an adhesive layer 19, FIG. 8C coating the carrier 18 (or optionally the adhesive layer 19) on at least one side (here on two sides) with a friction layer 20 comprising fibers and/or carbon in order to form the brake disc 5.

For example, the carrier 18 can be less elastic or more elastic than a brake disc 5 consisting entirely of the friction layer 20. Furthermore, the carrier 18 can consist of a low-cost plastic.

The step of coating the carrier 18 can comprise applying a partially elastic adhesive layer 19 on at least one side of the carrier 18, after which the friction layer 20 is applied to the adhesive layer 19.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE CHARACTERS 1 brake module
2 spindle
3 outer housing
4 spindle nut
5 brake disc
6 thrust washer
7 spring
8 housing
9 cover plate
10 latching recesses
11 latching hooks
12 housing slot
13 thrust washer projection
14 tooth section
15 clearance
16 tooth
17 spindle nut wing
18 carrier
19 adhesive layer
20 friction layer
BM braking momentum
BZ number of braking cycles
TB tolerance range
on the other hand as a function of the temperature.

The invention claimed is:

1. A brake module for a drive system for doors, comprising at least one thrust washer and at least one brake disc,
   a. wherein each of the at least one thrust washer and the at least one brake disc includes at least one friction surface which rub against each other in a braking operation, and
   b. wherein the at least one friction surface of the brake disc is formed by at least one friction layer for protecting the at least one brake disc and/or the at least one thrust washer from wear,
   c. wherein the at least one brake disc includes a carrier and the at least one friction layer is connected to the carrier,
   d. wherein the at least one friction layer comprises a carbon fiber mesh, and
   e. wherein the at least one thrust washer consists of non-nitrided chromium steel.

2. The brake module according to claim 1, wherein the brake module includes two thrust washers of the at least one thrust washer on two opposite sides of the at least one brake disc, wherein the at least one brake disc includes two friction surfaces of the at least one friction surface with the two friction layers facing the two thrust washers.

3. The brake module according to claim 1, wherein
   a. the carrier is made of a plastic, and/or
   b. two friction layers of the at least one friction layer are connected to the carrier on opposite sides of the carrier.

4. The brake module according to claim 1, wherein the at least one friction layer is fastened to the carrier by a material bond, by means of a partially elastic adhesive layer.

5. The brake module according to claim 1, wherein the at least one brake disc is annular and includes a central aperture, wherein the central aperture has an approximately circular cross-section having at least two tooth sections separated by clearances.

6. The brake module according to claim 1, wherein the at least one brake disc and/or the at least one thrust washer has a number of depressions in a friction surface for receiving a lubricant.

7. The brake module according to claim 1, wherein the brake module includes a housing in which the brake disc and the at least one thrust washer are guided, coaxially about a central axis, wherein the brake module comprises a cover plate which is connected to the housing by a latching connection such that the brake disc and the at least one thrust washer are held in the housing.

8. A production method for a brake module comprising at least one thrust washer consisting of non-nitrided chromium steel and at least one brake disc, wherein each of the at least one thrust washer and the at least one brake disc has at least one friction surface which rub against each other during a braking operation, the method having the following steps:
   a. providing a carrier and
   b. coating the carrier on at least one side with a friction layer comprising a carbon fiber mesh for wear protection to obtain the at least one brake disc of the brake module.

9. The production method according to claim 8, wherein the step of coating the carrier comprises applying a partially elastic adhesive layer on at least one side of the carrier, whereafter the friction layer is applied on the adhesive layer.

10. The production method according to claim 8, having the further following steps:
   a. providing at least one thrust washer blank, which consists of non-nitrided chromium steel, and
   b. at least one of polishing and deburring the thrust washer blank to obtain the at least one thrust washer of the brake module.

* * * * *